Figure 1:
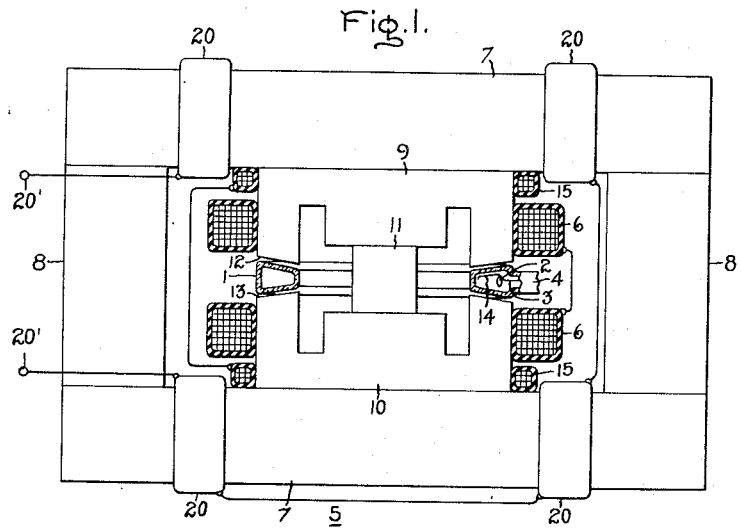

Inventor:
Russell N. Edwards,
by Paul A. Frank
His Attorney.

Inventor:
Russell N. Edwards,
by Paul A. Frank
His Attorney.

Patented Apr. 24, 1951

2,550,459

UNITED STATES PATENT OFFICE 2,550,459

SYSTEM AND APPARATUS FOR STARTING CHARGED PARTICLE ACCELERATORS

Russell N. Edwards, Schenectady, N. Y., assignor to General Electric Company, a corporation of New York Application June 16, 1950, Serial No. 168,503

12 Claims. (Cl. 323—89)

The present invention relates to apparatus for accelerating charged particles and in particular is concerned with improved means for starting such apparatus.

It is known that charged particles may be accelerated to high energy levels in an orbital path by the action of a time-varying magnetic flux which links the path to accelerate the particles and a time-varying magnetic guide field which simultaneously traverses the path to constrain the particles thereto. It is also known that, after charged particles have been accelerated in such a manner to a velocity near the velocity of light, additional energy may be imparted to the charged particles by means of a localized cyclically-varying electric field. Practical and efficient apparatus utilizing these principles is described in U. S. Patent 2,485,409, granted October 18, 1949, to Herbert C. Pollock and Willem F. Westendorp, and assigned to the General Electric Company, a corporation of New York.

In apparatus such as that described in the aforementioned Pollock and Westendorp patent the requisite time-varying flux is commonly produced by means of a laminated steel magnetic structure which partially surrounds the orbital path and which has a central saturable magnetic core traversing the plane of the orbital path. The time-varying magnetic flux is generated by one or more exciting windings which are placed upon the magnetic structure and energized by alternating current. The requisite time-varying magnetic guide field, which must co-exist with the time-varying magnetic flux as well as with the localized cyclically-varying electric field, is provided in conjunction with the magnetic structure by means of rotationally symmetrical pole pieces located above and below the orbital path. In order to minimize the amount of steel required in the magnetic structure for establishing the time-varying flux, the saturable core is so arranged that it will saturate at a time in the cycle of alternating current shortly after the initiation of the localized cyclically-varying electric field whereby, since the accelerating force of the time-varying flux is no longer needed, it will be prevented from increasing. Substantial savings in the amount of reactive power which must be supplied to the exciting windings may be secured by placing in circuit therewith power factor correcting capacitors. However, since the instantaneous inductance of the exciting windings is non-linear due to the periodic saturation of the saturable core during each cycle of the alternating current, it is apparent that a given amount of capacitance cannot be provided to cause the exciting windings to be resonant at all energizing voltages. Commonly the power factor correcting capacitors are so arranged that with a given frequency the exciting windings will be resonant at operating conditions of voltage, i. e. sufficient capacitance is provided to resonate with the apparent inductance of the exciting windings at operating voltage with a given source frequency. This means that during an initial starting period when the apparatus is being placed in operation and when the magnetic core is in an unsaturated condition at voltages below operating voltage, the exciting windings will not be resonated and hence a large leading current will be drawn from the source of alternating current. Unless means are provided for correcting the power factor of the exciting windings during the starting period, it is apparent that a large reserve output rating of the source of alternating current must be provided in order to prevent overloading of the source during the starting period. This reserve rating, of course, would not be necessary once the apparatus has been placed in steady state operation, and hence, if the need for reserve rating during the starting period can be eliminated, considerable savings may be realized.

In copending application Serial No. 749,853, filed May 22, 1947, now U. S. Patent 2,528,526, granted November 7, 1950, in the name of Willem F. Westendorp and assigned to the assignee of the present invention, there is shown apparatus for overcoming this difficulty which comprises direct current exciting windings placed on the magnetic structure and energized during the starting period with direct current for the purpose of saturating the magnetic structure and thereby reducing the apparent inductance of the energizing windings to secure a resonance condition during the starting period. The present invention provides simple, dependable and economical means for maintaining with such direct current exciting windings, resonance of the alternating current exciting windings throughout the starting period.

One aspect of the present invention more particularly described hereinafter comprises the provision of variable voltage supplying means for energizing the alternating current exciting windings, electrical transducer means connected between the input and output of the variable voltage supplying means and having an output connected to the direct current exciting windings, and means responsive to the current flow in the direct current exciting windings for varying the output of the variable voltage supplying means. To start the accelerator apparatus, the variable voltage supplying means is arranged to supply initially a low voltage to the alternating current exciting windings and, as a consequence, a maximum voltage is simultaneously applied to the direct current exciting windings. The means responsive to current flow in the direct current exciting windings causes the output of the variable voltage supplying means to increase whereby the current in the direct current exciting windings decreases proportionally. This results in the saturation of the magnetic structure to maintain the alternating current exciting windings in resonance throughout the starting period which may be of many cycles duration.

Figure 2:
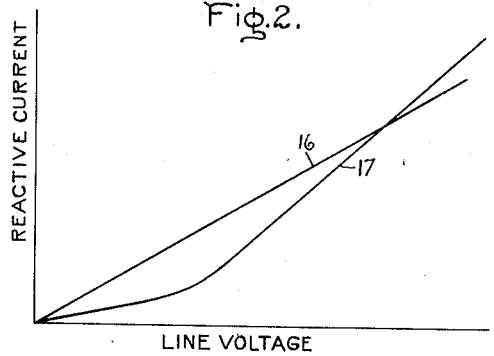
Figure 3:
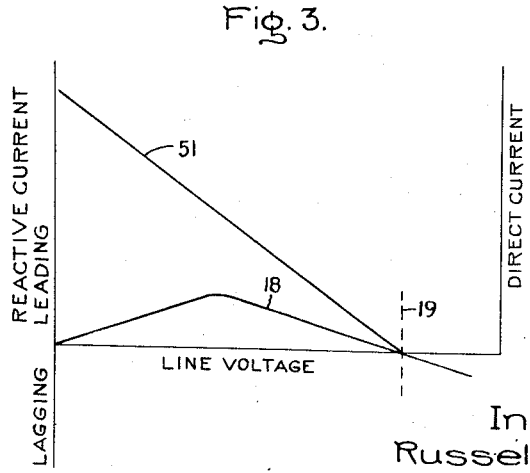
Figure 4:
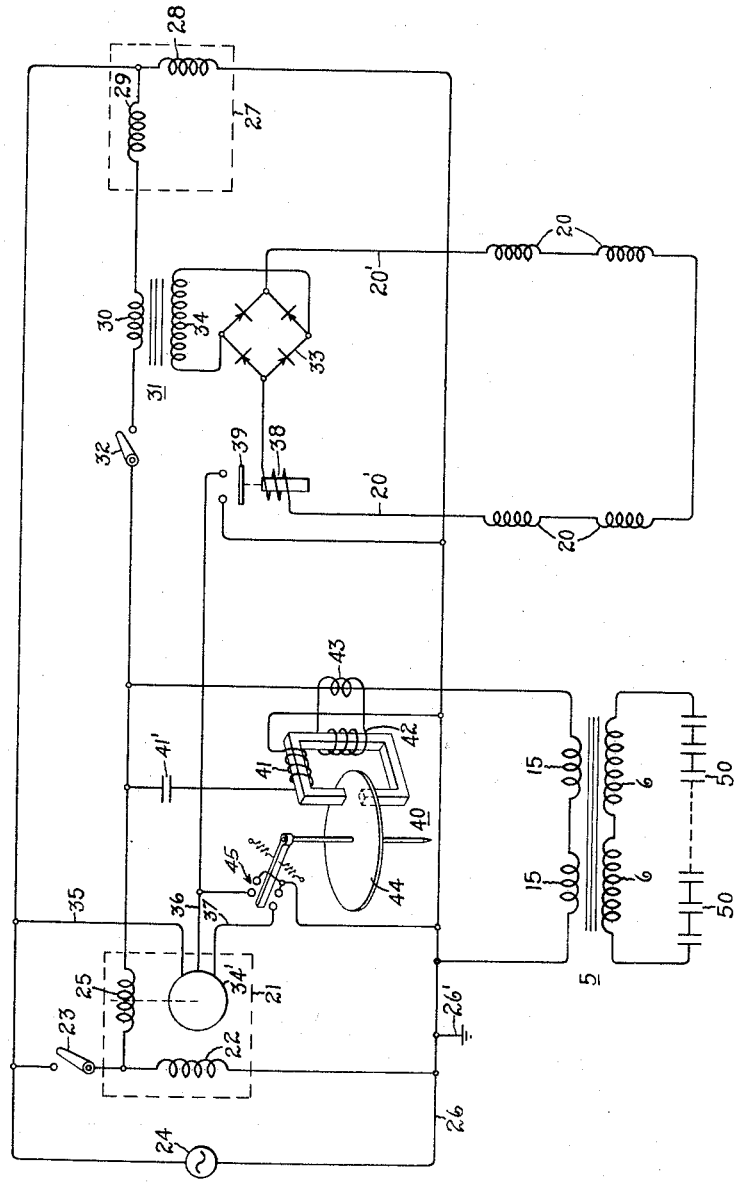

The features of the invention desired to be protected herein are pointed out with particularity in the appended claims. The invention itself, together with further objects and advantages thereof, may best be understood by reference to the following description taken in connection with the accompanying drawings in which Fig. 1 is a partially sectionalized elevation of accelerator apparatus suitably embodying the invention; Figs. 2 and 3 are graphical representations useful in explaining the invention; and Fig. 4 is a schematic representation of the circuit of the invention.

In Fig. 1 there is shown a sealed rotationally symmetrical vessel 1 of a dielectric material such as glass which provides within its interior an annular path along which charged particles may be accelerated. Charged particles, such as electrons, are supplied by a conventional electron source or gun 2 which may be energized through conductors 3 sealed into a side arm 4 of vessel 1. To secure acceleration of the electrons along an orbital path within vessel 1, which is highly evacuated, there is provided a laminated steel magnetic structure 5 which may be excited by alternating current exciting windings 6. Structure 5 comprises yoke members 7, leg members 8 and opposed rotationally symmetrical pole piece members 9 and 10. Supported between pole piece members 9 and 10 is a saturable laminated steel core 11. As is more fully described in the aforementioned Pollock and Westendorp Patent 2,485,409, structure 5, when energized by alternating current exciting windings 6, provides a magnetic flux path through saturable core 11 whereby a time-varying magnetic flux linking the orbital path may be obtained for the purpose of accelerating electrons from gun 2. By the proper shaping of the pole faces 12 and 13 of pole piece members 9 and 10 respectively, a radially decreasing time-varying magnetic guide field traversing the orbital path is provided for constraining the particles to the orbital path as they are accelerated by the time-varying magnetic flux linking the path.

If structure 5 is properly constructed to obtain certain required field and flux relationships (a detailed discussion of such relationships is presented in D. W. Kerst U. S. Patent No. 2,297,305 granted September 29, 1942 and assigned to the assignee of the present invention) electrons emerging from gun 2 may be accelerated to very high energy levels. As the electrons approach the velocity of light early in the cycle of the current in windings 6, however, further energy may be imparted to them by means of a localized cyclically-varying electric field suitably located along the orbital path, as is described in the aforementioned Pollock and Westendorp Patent 2,485,409. After the initiation of the electric field, which may be provided by means of a resonator (not shown) attached to envelope 1, the time-varying magnetic flux which links the orbital path through core 11 may be prevented from increasing by so arranging saturable core 11 that it will saturate at this time in the cycle of the current in windings 6. Further energy is then imparted to the electrons only by the localized cyclically-varying electric field, which may be continued until the magnetic guide field between pole faces 12 and 13 reaches a desired value whereupon the electrons may be diverted from their orbital path to strike a target 14 for the production of high energy X-rays. This cycle of events may be repeated periodically during each cycle of the current in windings 6 or of the time-varying magnetic field. Suitable circuits for periodically energizing gun 2 to inject electrons into the orbital path and for periodically initiating the resonator (not shown) to supply the cyclically-varying electric field in timed correlation with the variations of the magnetic field are shown and described in the aforementioned Pollock and Westendorp Patent 2,485,409.

As has been mentioned heretofore alternating current exciting windings 6, which may comprise the secondary windings of a transformer having primary windings 15 energized by a suitable source of alternating current (not shown), may be connected in circuit with capacitors 50 (Fig. 4) for the purpose of tuning the exciting winding circuit including windings 6 and 15 to resonance under operating conditions of voltage and frequency. Sufficient capacitance is provided by capacitors 50 so that the exciting winding circuit including windings 6 and 15 is resonant at normal operating voltage when core 11 is being periodically saturated. Therefore at voltages below the normal operating voltage the winding circuit is not resonant and a large leading current is drawn from the source of alternating current employed, as is shown by Figs. 2 and 3. In Fig. 2, curve 16 represents the capacitively reactive current which is drawn by capacitors 50 as a function of line voltage while curve 17 represents the inductively reactive current which is drawn by the winding circuit including windings 6 and 15 as a function of line voltage. The net current drawn from a source of alternating current by capacitors 50 and the winding circuit is the difference between curves 16 and 17, and is shown by curve 18 in Fig. 3, since one of the currents is lagging while the other is leading.

If an attempt is made to energize windings 15 by placing them directly across the supply mains, a high overloading of the power source will occur. The resulting internal reactive drop in the power source will prevent the windings from becoming fully energized. If the reactive current can be maintained at a low value as the windings are energized, however, this voltage drop may be avoided. Accordingly, series-connected direct current windings 20 having input terminals 20' are provided upon structure 5 for the purpose of saturating yoke and leg members 7 and 8 to cause the winding circuit to be substantially in resonance during the starting period.

Referring particularly now to the schematic representation of Fig. 4 wherein elements hereinbefore shown and described are designated by similar reference characters, there is shown a system for advantageously exciting the alternating current exciting windings 6 and 15 and direct current exciting windings 20 in accordance with the above-mentioned principles. To obtain a variable alternating voltage, there is provided an induction voltage regulator 21 having a primary winding 22 connected in series with a switch 23 across a source of alternating current 24. Alternating current exciting windings 15 are connected as shown to the output end of the secondary winding 25 of regulator 21 and the common bus 26, which may be maintained at ground potential as is indicated conventionally at 26'. Adjustable voltage supplying means for energizing direct current exciting windings 20 as an inverse function of the energization of exciting windings 15 comprises an induction voltage regulator 27 having a primary winding 28 connected in parallel with winding 22 across source 24. The output end of the secondary winding 29 of regulator 27 is connected to the output end of secondary winding 25 of regulator 21 through the primary winding 30 of a transformer 31 and a switch 32. Rectified alternating current is supplied to direct current exciting windings 20 by means of a full-wave rectifier 33, which may be of the dry-disc (selenium) type, connected across the secondary winding 34 of transformer 31.

In order to provide means for automatically varying the output voltage of regulator 21, a motor 34, mechanically connected to secondary winding 25, may be employed for varying the position of secondary winding 25 in a well known manner. Motor 34 may have a common energizing connection 35 connected to one side of the source 24 as shown and separate energizing connections 36 and 37 which may be alternately connected to the other side of source 24 to secure opposite directions of rotation of the motor armature. It may be assumed that, when motor 34 is energized through connections 35 and 36, the direction of rotation is such as to increase the output voltage of induction regulator 21 while, when motor 34 is energized through connections 35 and 37, the direction of rotation is such as to reduce the output voltage of induction regulator 21. A current responsive relay 38 is connected in circuit with rectifier 33 and direct current exciting windings 20 so that, when current is flowing through the direct current exciting windings, an armature 39 of relay 38 closes the energizing circuit to motor 34 through connections 35 and 36, thereby causing the output voltage of induction regulator 21 to increase.

For the purpose of controlling the output voltage of induction regulator 21 after relay 38 is inoperative as described hereinafter, there is provided a device 40 which is responsive to reactive current flow in windings 15. Device 40 may comprise an induction-disc type of reactive volt ampere meter device having a voltage winding 41 connected in series with a phase-shifting capacitor 41' across the output of induction regulator 21 and a current winding 42 energized through a current transformer 43 coupled to the connections for windings 15 as shown. When reactive current flows through windings 15, an induction disc 44 in device 40 tends to rotate in a clockwise or counter clockwise direction depending upon whether the current is inductively reactive or capacitively reactive. A switch 45 may be connected to disc 44 so that, when the current through windings 15 is capacitively reactive, connection 36 of motor 34 is connected to the common bus 26, thereby causing motor 34 to rotate to increase the output voltage of induction regulator 21. Conversely, when inductively reactive current flows through windings 15, disc 44 rotates in the opposite direction, thereby energizing motor 34 through connection 37 to cause it to rotate to decrease the output voltage of induction regulator 21.

It will now be apparent that the system of Fig. 4 operates to start the apparatus of Fig. 1 while maintaining the winding circuit including coils 6 and 15 substantially in resonance throughout the starting period. Initially, with switches 23 and 32 in the open position, induction regulator 27 is adjusted or pre-set to have an output voltage substantially equal to the desired operating voltage for exciting windings 15 when the accelerator apparatus is in steady state operation. Transformer 31, which may comprise an auto transformer, is adjusted so that when it is energized, it supplies a current through direct current windings of a value indicated by the zero voltage point of curve 51, Fig. 3. Thereafter, switch 23 is closed to apply power to induction regulator 21 and switch 32 is closed to energize direct current windings 20 through relay 38. Armature 39 of relay 38 then moves to close the circuit of motor 34 through connection 36, thereby causing motor 34 to rotate to raise the output voltage of induction regulator 21. As the output voltage of regulator 21 increases, the voltage across the primary winding 30 of transformer 31 decreases correspondingly. This results in the direct current through windings 20 decreasing as indicated by curve 51 of Fig. 3. In this manner the saturation of magnetic structure 5 is controlled to maintain the winding circuit including windings 6 and 15 substantially in resonance throughout the starting period of the apparatus. The saturation curve of magnetic structure 5 during the starting period is, however, such that a small amount of capacitively reactive current flows through windings 15, thereby causing device 40 to close switch 45 through connection 36 to motor 34 and hence continue to increase the output voltage of induction regulator 21 even though armature 39 of relay 38 may open when the direct current through windings 20 decreases to a low value. When normal operating voltage is reached the current through direct current exciting windings 20 is essentially zero and switch 32 may thereafter be opened.

After the accelerating apparatus has been placed in steady state operation, device 40 operates to maintain the exciting winding circuit including windings 6 and 15 substantially in resonance. For excess capacitively reactive current in windings 15, disc 44 rotates to close switch 45 to energize motor 34 through connections 35 and 36 whereby the voltage across windings 15 is raised to cause compensating inductively reactive current to be drawn by windings 15. For excess inductively reactive current, device 40 operates to cause motor 34 to be energized through connections 35 and 37 for converse compensation.

Commonly, in accelerator apparatus as hereinbefore described, the reactive ampere turns of windings 6 are of the order of one hundred and twenty times the ampere turns representing power loss therein and, therefore, a relatively small inductively reactive or capacitively reactive current in coils 6 corresponds to a large change in current through coils 15 and a large departure from resonance. Thus a change of a few per cent in the output voltage of induction regulator 21 causes a much greater change in the current through windings 15, thereby allowing a small adjustment of the output voltage of regulator 21 through motor 34 and device 40 to compensate for a large departure from resonance.

It will be obvious to those skilled in the art that, if source 24 can be arranged to have the desired operating voltage for the accelerator apparatus, regulator 27 may be eliminated. Also, it will be apparent that regulator 21 may be manually operable with the consequent elimination of the motor controls if circuit economy is more important than completely automatic operation.

While the invention has been described by reference to particular embodiments thereof, it will be understood that numerous changes may be made without actually departing from the invention. I, therefore, aim in the appended claims to cover this and all such equivalent variations of the invention as are within the true spirit and scope of the foregoing disclosure.

What I claim as new and desire to secure by Letters Patent of the United States is:

1. A regulating system for use with a saturable magnetic circuit having an alternating current exciting winding which is resonant at operating voltage but excessively inductive at lower voltages and a direct current exciting winding for saturating the magnetic circuit to decrease the inductance of the alternating current exciting winding, said system comprising an induction regulator having a primary winding and a secondary winding, input means for connecting a source of alternating current to said regulator primary winding, said regulator having output connections for directing the output of said regulator to the alternating current exciting winding for energization thereof, a transformer having a primary winding and a secondary winding, said transformer primary winding being connected across said regulator secondary winding whereby said transformer may be energized by a voltage substantially equal to the difference between the input and output voltages of said regulator, said transformer secondary winding being connected in circuit with rectifying means and having output connections for supplying direct current to the direct current exciting winding for energization thereof, and means for increasing the output voltage of said regulator as the current in said transformer secondary winding circuit decreases whereby the alternating current exciting winding may be maintained near resonance during the energization thereof.

2. A regulating system for use with a saturable magnetic circuit having an alternating current exciting winding which is resonant at operating voltage but excessively inductive at lower voltages and a direct current exciting winding for saturating the magnetic circuit to decrease the inductance of the alternating current exciting winding, said system comprising an induction regulator having a primary winding and a secondary winding, input means for connecting a source of alternating current to said regulator primary winding, said regulator having output connections for directing the output of said regulator to the alternating current exciting winding for energization thereof, a transformer having a primary and a secondary winding, said transformer primary winding being connected across said regulator secondary winding whereby said transformer may be energized by a voltage substantially equal to the difference between the input and output voltages of said regulator, said transformer secondary winding being connected in circuit with rectifying means and having output connections for supplying direct current to the direct current exciting winding for energization thereof, and means responsive to the current in said transformer secondary winding circuit for increasing the output voltage of said regulator as the current in said transformer secondary winding circuit decreases whereby the alternating current exciting winding may be maintained near resonance during the energization thereof.

3. A regulating system for use with a saturable magnetic circuit having alternating current exciting windings which are resonant at operating voltage but excessively inductive at lower voltages and direct current exciting windings for saturating the magnetic circuit to decrease the inductance of the alternating current exciting windings, said system comprising a first induction regulator having a primary winding and a secondary winding, input means for connecting a source of alternating current to said regulator primary winding, said regulator having output connections for directing the output of said regulator to the alternating current exciting windings for energization thereof, a second induction regulator having a primary winding and a secondary winding, said primary winding of said second regulator being connected in parallel with said primary winding of said first regulator, a transformer having a primary winding and a secondary winding, said transformer primary winding and said secondary winding of said second regulator being connected in series-parallel circuit with said secondary winding of said first regulator whereby said transformer may be energized by a voltage substantially equal to the difference between the output voltages of said first and second regulators, said transformer secondary winding being connected in circuit with rectifying means and having output connections for supplying direct current to the direct current exciting windings for energization thereof, and means responsive to the current in said transformer secondary winding circuit for increasing the output voltage of said first regulator as the current in said transformer secondary winding circuit decreases whereby the alternating current exciting windings may be maintained near resonance during the energization thereof.

4. A regulating system for use with a saturable magnetic circuit having alternating current exciting windings which are resonant at operating voltage but excessively inductive at lower voltages and direct current exciting windings for saturating the magnetic circuit to decrease the inductance of the alternating current exciting windings, said system comprising a first induction regulator having a primary winding and a secondary winding, input means for connecting a source of alternating current to said regulator primary winding, said regulator having output connections for directing the output of said regulator to the alternating current exciting windings for energization thereof, a second induction regulator having a primary winding and a secondary winding, said primary winding of said second regulator being connected in parallel with said primary winding of said first regulator, a transformer having a primary winding and a secondary winding, said transformer primary winding and said secondary winding of said second regulator being connected in series-parallel circuit with said secondary winding of said first regulator whereby said transformer may be energized by a voltage substantially equal to the difference between the output voltages of said first and second regulators, said transformer secondary winding being connected in circuit with rectifying means and having output connections for supplying direct current to the direct current exciting windings for energization thereof, and means for increasing the output voltage of said first regulator whereby the current in said transformer secondary winding circuit will decrease and the alternating current exciting windings may be maintained near resonance during the energization thereof.

5. A regulating system for use with a saturable magnetic circuit having alternating current exciting windings which are resonant at operating voltage but excessively inductive at lower voltages and direct current exciting windings for saturating the magnetic circuit to decrease the inductance of the alternating current exciting windings; said system comprising an induction regulator having a primary winding and a secondary winding, input means for connecting a source of alternating current to said regulator primary winding, said regulator having output connections for directing the output of said regulator to the alternating current exciting windings for energization thereof, said regulator secondary winding being initially positioned to cause the output of said regulator to be near zero when said input means are energized, a transformer having a primary winding and a secondary winding, said transformer primary winding being connected in parallel with said regulator secondary winding whereby said transformer may be energized by a voltage substantially equal to the difference between the input and output voltages of said regulator, said transformer secondary winding being connected in circuit with rectifying means and having output connections for supplying direct current to the direct current exciting windings for energization thereof, means responsive to the current in said transformer secondary winding circuit for increasing the output voltage of said regulator as the current in said transformer secondary winding circuit decreases whereby the alternating current exciting windings may be maintained near resonance during the energization thereof, and means responsive to reactive current flow in the output circuit of said regulator for varying the output voltage of said regulator whereby the alternating current exciting windings may be continuously energized near resonance.

6. A regulating system for use with a saturable magnetic circuit having alternating current exciting windings which are resonant at operating voltage but excessively inductive at lower voltages and direct current exciting windings for saturating the magnetic circuit to decrease the inductance of the alternating current exciting wingings, said system comprising a first induction regulator having a primary winding and a secondary winding, input means for connecting a source of alternating current to said regulator primary winding, said regulator having output connections for directing the output of said regulator to the alternating current exciting windings for energization thereof and said regulator secondary winding being initially positioned to cause the output voltage of said regulator to be near zero when said input means are energized, a second induction regulator having a primary winding and a secondary winding, said primary winding of said second regulator being connected in parallel with said primary winding of said first regulator and said secondary winding of said second regulator being positioned to cause the output voltage of said second regulator to be substantially equal to the desired operating voltage for the alternating current exciting windings, a transformer having a primary winding and a secondary winding, said transformer primary winding and said secondary winding of said second regulator being connected in series-parallel circuit with said secondary winding of said first regulator whereby said transformer may be energized by a voltage substantially equal to the difference between the output voltages of said first and second regulators, said transformer secondary winding being connected in circuit with rectifying means and having output connections for supplying direct current to the direct current exciting windings for energization thereof, means responsive to the current in said transformer secondary winding circuit for increasing the output voltage of said first regulator as the current in said transformer secondary winding circuit deceases whereby the alternating current exciting windings may be maintained near resonance during the energization thereof, and means responsive to reactive current flow in the output circuit of said first regulator for varying the output voltage of said first regulator whereby the alternating current exciting windings may be continuously energized near resonance.

7. In apparatus for accelerating charged particles, the combination which comprises a magnetic structure saturable when excited at operating voltage, alternating current exciting windings for said structure having sufficient capacitance in circuit therewith for causing said windings to be resonant at operating voltage but excessively inductive at lower voltages when said apparatus is being started, direct current exciting windings for decreasing the inductance of said alternating current exciting windings by saturating said structure when said apparatus is being started, variable voltage supplying means having an input connected to a source of alternating current and an output connected to said alternating current exciting windings whereby said alternating current exciting windings may be initially energized at low voltages, electrical transducer means having an input connected between the input and output of said variable voltage supplying means and an output connected to said direct current exciting windings whereby said direct current exciting windings may be energized in inverse proportion to said alternating current exciting windings, and means responsive to current flow in said direct current exciting windings for varying the output of said variable voltage supplying means from an initial low voltage to operating voltage for said alternating current exciting windings whereby the current in said direct current exciting windings will decrease proportionally and said apparatus may be started while maintaining said alternating current exciting windings substantially in resonance.

8. In apparatus for accelerating charged particles, the combination which comprises a magnetic structure saturable when excited at operating voltage, alternating current exciting windings for said structure having sufficient capacitance in circuit therewith for causing said windings to be resonant at operating voltage but excessively inductive at lower voltages when said apparatus is being started, direct current exciting windings for decreasing the inductance of said alternating current exciting windings by saturating said structure when said apparatus is being started, variable voltage supplying means having an input connected to a source of alternating current and an output connected to said alternating current exciting windings whereby said alternating current exciting windings may be initially energized at low voltages, electrical transducer means having an input connected between the input and output of said variable voltage supplying means and an output connected to said direct current exciting windings whereby said direct current exciting windings may be energized in inverse proportion to said alternating current exciting windings, and means for varying the output of said variable voltage supplying means from an initial low voltage to operating voltage for said alternating current exciting windings whereby the current in said direct current exciting windings will decrease proportionally and said apparatus may be started while maintaining said alternating current exciting windings substantially in resonance.

9. In apparatus for accelerating charged particles, the combination which comprises a magnetic structure saturable when excited at operating voltage, alternating current exciting windings for said structure having sufficient capacitance in circuit therewith for causing said windings to be resonant at operating voltage but excessively inductive at lower voltages when said apparatus is being started, direct current exciting windings for decreasing the inductance of said alternating current exciting windings by saturating said structure when said apparatus is being started, a first variable voltage supplying means having an input connected to a source of alternating current and its output connected to said alternating current exciting windings whereby said alternating current exciting windings may be initially energized at low voltages to start said apparatus, a second variable voltage supplying means having an input connected to said source of alternating current and an output adaptable for pre-setting at the operating voltage of said alternating current exciting windings, electrical transducer means having an input connected between the output of said first variable voltage supplying means and the output of said second variable voltage supplying means and an output connected to said direct current exciting windings whereby said direct current exciting windings may be initially energized at substantially the voltage required to decrease the inductance of said alternating current winding to resonance, and means (responsive to current flow in said direct current exciting windings) for varying the output of said first variable voltage supplying means from an initial low voltage to operating voltage for said alternating current exciting windings whereby the input to said transducer means will decrease proportionally to decrease the current in said direct current exciting windings accordingly and said apparatus may be started while maintaining said alternating current exciting windings substantially in resonance.

10. In apparatus for accelerating charged particles, the combination which comprises a magnetic structure saturable when excited at operating voltage, alternating current exciting windings for said structure having sufficient capacitance in circuit therewith for causing said windings to be resonant at operating voltage but excessively inductive at lower voltages when said apparatus is being started, direct current exciting windings for decreasing the inductance of said alternating current exciting windings by saturating said structure when said apparatus is being started, a first variable voltage supplying means having an input connected to a source of alternating current and its output connected to said alternating current exciting windings whereby said alternating current exciting windings may be initially energized at low voltages to start said apparatus, a second variable voltage supplying means having an input connected to said source of alternating current and an output adaptable for pre-setting at the operating voltage of said alternating current exciting windings, electrical transducer means having an input connected between the output of said first variable voltage supplying means and the output of said second variable voltage supplying means and an output connected to said direct current exciting windings whereby said direct current exciting windings may be initially energized at substantially the voltage required to decrease the inductance of said alternating current windings to resonance, and means for varying the output of said first variable voltage supplying means from an initial low voltage to operating voltage for said alternating current exciting windings whereby the input to said transducer means will decrease proportionally to decrease the current in said direct current exciting windings accordingly and said apparatus may be started while maintaining said alternating current exciting windings substantially in resonance.

11. In apparatus for accelerating charged particles, the combination which comprises a magnetic structure saturable when excited at operating voltage, alternating current exciting windings for said structure having sufficient capacitance in circuit therewith for causing said windings to be resonant at operating voltage but excessively inductive at lower voltages when said apparatus is being started, direct current exciting windings for decreasing the inductance of said alternating current exciting windings by saturating said structure when said apparatus is being started, variable voltage supplying means having an input connected to a source of alternating current and an output connected to said alternating current exciting windings whereby said alternating current exciting windings may be initially energized at low voltages, electrical transducer means having an input connected between the input and output of said variable voltage supplying means and an output connected to said direct current exciting windings whereby said direct current exciting windings may be energized in inverse proportion to said alternating current exciting windings, means responsive to current flow in said direct current exciting windings for varying the output of said variable voltage supplying means from an initial low voltage to operating voltage for said alternating current exciting windings whereby the current in said direct current exciting windings will decrease proportionally and said apparatus may be started while maintaining said alternating current exciting windings substantially in resonance, and means responsive to reactive current flow in said alternating current exciting windings for varying the output of said variable voltage supplying means whereby said alternating current exciting windings may be continuously energized near resonance during operation of said apparatus.

12. In apparatus for accelerating charged particles, the combination which comprises a magnetic structure saturable when excited at operating voltage, alternating current exciting windings for said structure having sufficient capacitance in circuit therewith for causing said windings to be resonant at operating voltage but excessively inductive at lower voltages when said apparatus is being started, direct current exciting windings for decreasing the inductance of said alternating current exciting windings by saturating said structure when said apparatus is being started, a first variable voltage supplying means having an input connected to a source of alternating current and its output connected to said alternating current exciting windings whereby said alternating current exciting windings may be initially energized at low voltages to start said apparatus, a second variable voltage supplying means having an input connected to said source of alternating current and an output adaptable for pre-setting at the operating voltage of said alternating current exciting windings, electrical transducer means having an input connected between the output of said first variable voltage supplying means and the output of said second variable voltage supplying means and an output connected to said direct current exciting windings whereby said direct current exciting windings may be initially energized at substantially the voltage required to decrease the inductance of said alternating current windings to resonance, means responsive to current flow in said direct current exciting windings for varying the output of said first variable voltage supplying means from an initial low voltage to operating voltage for said alternating current exciting windings whereby the input to said transducer means will decrease proportionally to decrease the current in said direct current exciting windings accordingly and said apparatus may be started while maintaining said alternating current exciting windings substantially in resonance, and means responsive to reactive current flow in said alternating current windings for varying the output of said first variable voltage supplying means whereby said alternating current exciting windings may be continuously energized near resonance during operation of said apparatus.

RUSSELL N. EDWARDS.

No references cited.